Apr. 3, 1923.
J. C. WILLIAMS
RIPSAW STICKER HEAD
Filed Aug. 29, 1922
1,450,659
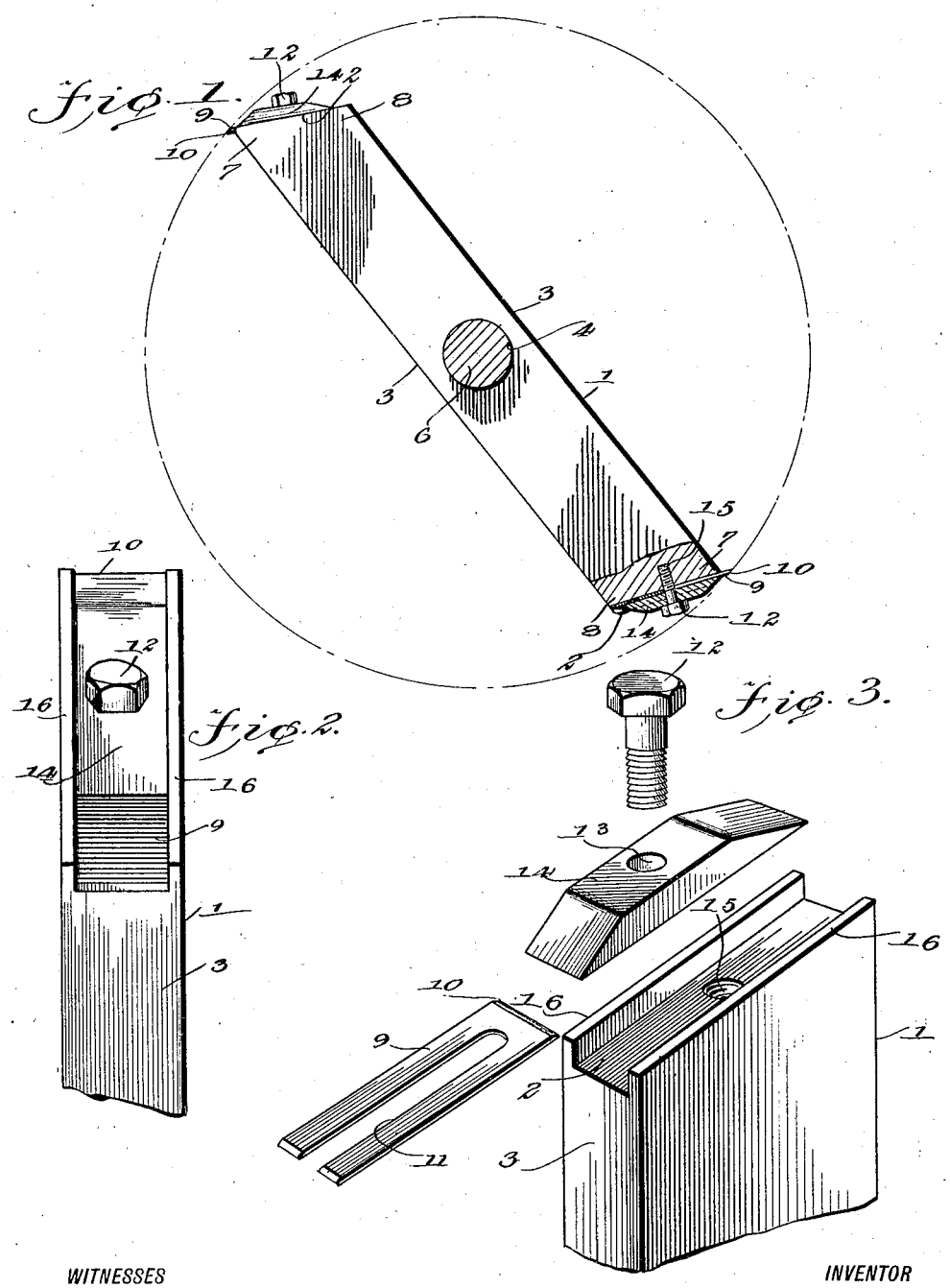
WITNESSES
INVENTOR
J. C. Williams,
BY
ATTORNEYS Patented Apr. 3, 1923.

1,450,659

UNITED STATES PATENT OFFICE.

JOSEPH CLARK WILLIAMS, OF CLEVELAND, OHIO.

RIPSAW STICKER HEAD.

Application filed August 29, 1922. Serial No. 584,971.

*To all whom it may concern:*

Be it known that I, JOSEPH C. WILLIAMS, a citizen of the United States, and a resident of Cleveland, in the county of Cuyahoga and State of Ohio, have invented certain new and useful Improvements in Ripsaw Sticker Heads, of which the following is a specification.

My invention relates generally to cutter heads, more particularly to cutter heads carrying blades used in wood working, and it consists in the combinations, constructions and arrangements herein described and claimed.

An object of my invention is to provide a cutter head which is adapted to be operatively applied to any saw arbor of known construction and holding cutters for use in woodworking in the production of mouldings of different configurations and for finishing strips of moulding to adapt them to be joined together by coped joints.

A further object of my invention is to provide a cutter head of the character described which is of simplified construction and affords facilities whereby cutting blades of different sizes can be firmly secured to the head in desired positions thereon.

Other objects and advantages will be apparent from the following description, and the novel features of the invention will be particularly outlined in the appended claims.

My invention is illustrated in the accompanying drawings, forming a part of this application, in which:

Figure 1 is a view, partly in elevation and partly in section, of a cutter head embodying the invention in applied position on an arbor and being provided with cutter blades.

Figure 2 is an enlarged plan view of a fragmentary portion of the cutter head, showing a blade in operative position thereon, and Figure 3 is an enlarged group view, showing in perspective a fragmentary portion of the cutter head, a blade therefor, a cap plate and a cap screw for clamping the blade to the cutter head.

In carrying out my invention, I provide a cutter head which is designated at 1 in the drawings and has the form of a parallelogram, the end walls 2—2 thereof extending obliquely to the side walls 3—3. The cutter head 1 is provided with a transverse bore 4 extending transversely therethrough equi-distantly from the ends 2—2 of the head adapted to engage in the usual manner with an arbor 6, whereby the cutter head can be mounted on the arbor to rotate therewith. As stated, the end walls 2—2 of the head lie in planes extending obliquely to the plane of the transverse axis of the head, whereby the corner portions 7—7 of the head are located or rather extend farther from the transverse axis of the head than the opposite corner portions 8—8. Cutter blades 9—9 having cutting edges 10 at one end thereof, are adapted to be disposed in flatwise relation to the end walls 2—2 so that the cutting edges 10 extend beyond the longitudinal side walls of the head at the corners 7—7. Cutter blades 9—9 are provided with slots 11 extending longitudinally from the end thereof remote from the cutting edge intermediately of their side edges. Cap screws 12 or the like can be projected through openings 13 in cap plates 14 and through the slots 11 of the cutter blades into engagement with threaded sockets 15 in the ends of the cutter head whereby the cutter blades can be firmly clamped in adjusted position to the end walls of the cutter head. Cutter blades of different sizes can be used with the same cutter head. The cutter head is preferably provided with a pair of parallel side flanges 16—16 at each end thereof when the cutter head is designed for use with cutter blades of relatively small size. The flanges 16—16 serve as guides for use in adjusting the relatively small blades on the ends of the cutter head and can be dispensed with when larger blades are employed.

With the organization described, cutter blades of various dimensions and blades varying considerably from a standard size, can be used with the same same cutter head without having any detrimental effect upon the work produced.

A plurality of relatively narrow cutter blades can be arranged side by side upon either or both of the end walls 2—2 and securely clamped to the latter by the cap plates and cap screws in the manner described.

Obviously, my invention is susceptible of embodiment in forms other than that herein described and claimed, and I therefore consider as my own, all such modifications and adaptations of the form herein shown as fairly fall within the spirit of the invention and the scope of the appended claims.

I claim:—

1. A cutter head comprising a longitudinal body having parallel faces at the ends thereof and having outstanding flanges extending along the lateral marginal edges of said faces, a cutter blade for each of said faces, each cutter blade being of such width as to be adapted to slide on one of said faces between the flanges thereon, said cutter blade having a longitudinal slot therein, and a cap plate for each face, said cap plate being substantially co-extensive in area with the face and being adapted to be superimposed on the cutter blade thereon, and means extending through each cap plate and through the slot of the underlying cutter blade into threaded engagement with said body for releasably holding said cutter blade clamped against the underlying face in adjusted relation to the body.

2. A cutter head comprising a longitudinal body having parallel faces at the ends thereof and having outstanding flanges extending along the lateral marginal edges of said faces, a cutter blade for each of said faces, each cutter blade being of such width as to be adapted to slide on one of said faces between the flanges thereon, said cutter blade having a longitudinal slot therein, and a cap plate for each face, said cap plate being substantially co-extensive in area with the face and being adapted to be superimposed on the cutter blade thereon, said cap plate also having the outer wall thereof beveled at its opposite ends, and means extending through each cap plate and through the slot of the underlying cutter blade into threaded engagement with said body for releasably holding said cutter blade clamped against the underlying face in adjusted relation to the body.

JOSEPH CLARK WILLIAMS.